United States Patent [19]

Shaw

[11] Patent Number: 4,565,963
[45] Date of Patent: Jan. 21, 1986

[54] TEST CIRCUIT FOR MOTOR VEHICLE SPEED CONTROL

[75] Inventor: Mark L. Shaw, Fort Worth, Tex.

[73] Assignee: Specific Cruise Systems, Inc., Fort Worth, Tex.

[21] Appl. No.: 482,834

[22] Filed: Apr. 7, 1983

[51] Int. Cl.$^4$ .............................................. G01R 31/02
[52] U.S. Cl. ..................................................... 324/51
[58] Field of Search ......................... 324/51, 73 R, 133

[56] References Cited

U.S. PATENT DOCUMENTS 4,220,912  9/1980  Williams ............................... 324/51

Primary Examiner—Stanley T. Krawczewicz
Attorney, Agent, or Firm—James E. Bradley

[57] ABSTRACT

A test circuit for a motor vehicle cruise control system allows testing of the system without driving the vehicle. The cruise control system is of a type that has a vacuum servo for moving the throttle, solenoid valves for varying the vacuum in the servo, an electronic control module for controlling the solenoid valves, and a speed sensor that provides pulses to the control module corresponding to the actual vehicle speed. The test circuit is adapted to be connected between the control module and the leads extending to the various components of the system. The test circuit has series leads that connect the terminals of the system directly with the control module, except for the leads from the speed sensor. The test circuit has indicating means for determining whether or not voltage potential is present in the series leads to check continuity. An oscillator in the test circuit applies pulses to the control module that simulate pulses provided by the speed sensor.

7 Claims, 4 Drawing Figures

TEST CIRCUIT FOR MOTOR VEHICLE SPEED CONTROL

BACKGROUND OF THE INVENTION

1. Field of the Invention

This invention relates in general to speed governors or control systems for motor vehicles, and in particular to a circuit for testing such a system to determine whether or not it is operable.

2. Description of the Prior Art

This invention deals with the testing of speed control systems for motor vehicles, usually called cruise controls. These systems operate from the engine vacuum and have a vacuum servo which will pull the throttle of the carburetor open with increased vacuum. The position of the vacuum servo is controlled by a vacuum valve, which is connected to the intake manifold, and a vent valve, which opens the servo to atmosphere to reduce the vacuum and to decrease the speed. A speed sensor monitors the actual speed of the vehicle and supplies a signal to an electronic control module. The control module will control the opening and closing of the vacuum and vent valve solenoids according to the speed selected by a speed selector switch.

Many of these systems are installed on vehicles after the vehicles have been shipped from the factory. One prior art method of testing such a system installed away from the factory, is to actually test drive the vehicle. Test driving is time consuming and expensive. Also, in certain installation areas, such as a shipping port, there may be inadequate space at the port to bring the vehicle up to cruising speed to test the system. If the system is defective, determining the point of trouble is not easy. Continuity can be checked on the wires leading to the various electrical components. However, a defect could be in a solenoid valve, a switch, or in the control module. Often, finding the defect requires trial and error substitution of the various components.

SUMMARY OF THE INVENTION

A test means is provided for testing motor vehicle speed control systems without having to actually drive the vehicle. This test means includes a test circuit that is adapted to be connected between the wire harness and the control module. The wire harness leads to the selector switch, the speed sensor and the solenoids for the valves. The control module contains the electronic circuitry for controlling the solenoid valves.

This test circuit has series leads that connect the terminals of the solenoid valves and the selector switch directly with the respective terminals of the control module to which they are normally connected. The test circuit has indicating means for indicating whether or not voltage potential is present in these series leads. Also, an oscillator is located in the test circuit for applying pulses to the control module that simulate the pulses provided by the speed sensor. These pulses correspond to a selected speed and allow the control module to send out control signals to the solenoid valves as if the system were operating with the vehicle moving.

Should the valves fail to operate, in order to determine whether or not the control module is defective or the valves themselves are defective, push button grounding controls are provided for each valve. Depressing the button grounds each valve, allowing the valves to be manually opened and closed to determine whether or not the valves are operating properly.

DESCRIPTION OF THE PREFERRED EMBODIMENT

Figure 1:
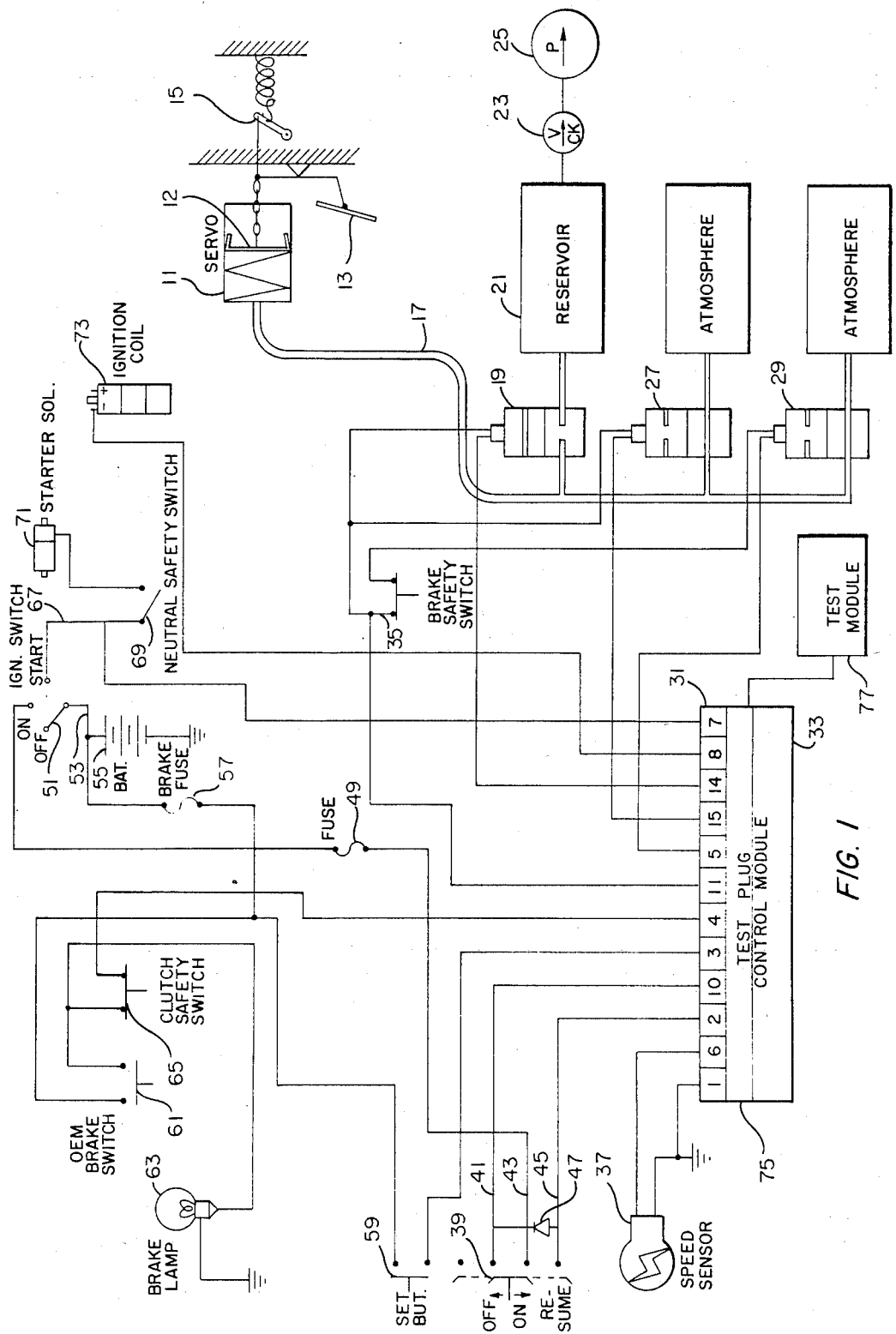
FIG. 1 is a schematic view illustrating a speed control system with the test means connected into the system for testing.

FIG. 1 discloses a prior art speed control system for a motor vehicle. A more detailed description of this system is contained in U.S. Pat. No. 4,345,663, issued Aug. 24, 1982, Neal G. Shields. This system includes a vacuum servo 11 that has a piston 12 contained within a cylinder. Piston 12 is linked to the vehicle accelerator pedal 13. Accelerator pedal 13 is linked to the carburetor throttle 15. Increased vacuum on the left side of piston 12 causes throttle 15 to advance. Throttle 15 is biased to a closed position by a spring so that when vacuum is relieved, the spring will move piston 12 to the right and the throttle 15 will begin to close.

A vacuum line 17 draws the vacuum in the servo 11. Vacuum line 17 is connected to a solenoid valve 19. The other side of solenoid valve 19 is connected to a reservoir 21 containing air under less pressure than atmospheric, or a vacuum. The reservoir 21 is maintained under vacuum through a check valve 23 that is connected to the intake manifold 25. If solenoid valve 19 is in the closed position, as shown in FIG. 1, the vacuum in reservoir 21 is not communicated to servo 11. If solenoid valve 19 is energized, it will move the valve to the open position, communicating the vacuum and reservoir 21 with the servo 11.

Vacuum line 17 is also connected to a vent solenoid valve 27, which serves to relieve the vacuum in the servo 11. Vent valve 27 is connected to atmosphere. When in the nonenergized position, as shown in FIG. 1, the servo 11 will be exposed to atmospheric pressure. When the solenoid of valve 27 is energized, the atmospheric pressure will be blocked from vacuum line 17.

A safety solenoid valve 29 is also connected to vacuum line 17 and operates similar to the vent valve 27. Safety valve 29 is connected to atmosphere when in the nonenergized position. When the solenoid of safety valve 29 is energized, it will block atmospheric pressure from communicating to the servo 11.

The solenoids of valves 19, 27 and 29 in normal operation have continuous voltage supplied to one side. When the other side is grounded, a circuit is completed to energize the solenoid to move from the position shown in FIG. 1 to the opposite position. Vacuum valve 19 has one lead connected to pin 11 of a wire harness plug 31. Pin 11 normally connects to a pin 11 of an electronic control module 33. Control module 33 is a micro computer that controls the opening and closing of the valves 19 and 27 according to various conditions encountered. The second lead for a vacuum solenoid 19 is connected to pin 14 of wire harness 31. Control module 33 supplies power to pin 11, and will ground pin 14 to complete the circuit when the speed sensed is less than the speed selected.

Vent valve 27 is also connected to the pin 11 of wire harness 31 to receive power. The other side of vent valve 27 is connected to pin 15. When control module 33 senses that the actual speed is not less than the speed selected by the operator, it will ground pin 15, blocking atmospheric pressure from servo 11 to maintain throttle 15 in a closed position.

Safety valve 29 has its power side connected to a normally closed brake safety switch 35. Brake safety switch 35 is connected to the power line leading to pin 11. When the brake pedal (not shown) of the vehicle is depressed, brake safety switch 35 opens, interrupting power to safety valve 29. Safety valve 29 has its other lead connected to pin 5 of wire harness 31. Control module 33 provides grounding for pin 5 to maintain safety valve 29 in an energized position, blocking atmospheric pressure from servo 11, unless brake safety switch 35 is open, or the system is otherwise disengaged.

The cruise control system also includes a speed sensor 37 which may be connected to different points in the drive system of the vehicle to indicate actual vehicle speed. The speed sensor 37 has one lead connected to pin 6 of wire harness plug 31 for providing power. The other lead of speed sensor 37 is connected to ground, which is also connected to pin 1 of the wire harness. One type of speed sensor 37, known as the reed switch type, alternately grounds pin 6 to provide pulses as the vehicle moves. Another type is an inductive generator that alternately provides high impedance to create pulses.

The operator selectively actuates the system and controls the speed through a selector switch 39. Selector switch 39 is a sliding type switch that operates both as on, off and resume. In the on position, selector switch 39 connects lines 41 and 43. In the resume position, lines 43 and 45 are connected together. The off position is an open position in which none of the lines 41, 43 and 45 are connected together. Line 41 is connected to pin 10 of the wire harness plug 31. Line 45 is connected to pin 2 of the wire harness plug 31. A diode 47 is connected between pins 41 and 45. Line 43 is connected through a fuse 49 to the on position of the ignition switch 51. When in the on position, power is provided through line 53 of the ignition switch 51, line 53 being connected to the vehicle battery 55. Line 53 is also connected through the brake light fuse 57 back to one terminal of a set button 59. The other terminal of set button 59 is connected to pin 3 of the wire harness plug 31.

The conventional brake switch 61 for lighting the brake lamp 63 is connected to fuse 57. If the car is a manual transmission type, a normally closed clutch safety switch 65 will have one side connected between lamp 63 and brake switch 61. The other side of clutch switch 65 is connected to pin 4 of wire harness plug 31.

The ignition switch 51 further includes a line 67 that leads from the start position to pin 7 of the wire harness plug 31. The vehicle will have a neutral safety switch 69 that is connected to the starter solenoid 71 and to line 67. Line 67 can energize the starter solenoid 71 only if the neutral safety switch 69 is closed, indicating that the vehicle is in neutral or park. Pin 8 of the wire harness plug 31 is connected to the ignition coil 73 so as to provide a tachometer or engine speed indication to the control module 33.

In normal operation of the system, when the set button 59 is depressed and the selector 39 in the on position, and the vehicle is moving in the cruise control range, power will be provided to pin 3 of the control module 33 to cause the control module to maintain the speed at which the vehicle is currently operating. Selector switch 39 will be providing power on line 41 to pin 10 of the control module 33. The control module will provide power out on pin 11 to the solenoids 19, 27 and 29. The control module will provide grounding on pins 5, 15 and 14 to energize all of the valves. Vacuum will be provided by the reservoir 21 to the servo 11, to maintain the throttle 15 in an open position. Speed sensed by the pulses from speed sensor 37 cause the control module 33 to selectively ground pins 14 and 15 to advance and release throttle 13 to maintain the desired speed. If the brake is depressed, switch 61 will close, providing power on line 4 and signaling the control module 33 to deenergize valves 19, 27 and 29. At the same time, as a safety measure, brake safety switch 35 will open, deenergizing safety valve 29. Pressing clutch switch 65 deenergizes valves 19, 27 and 29. To resume the previous speed, shifting button 39 to resume provides power on line 45 to pin 2 of wire harness plug 31. The control module 33 will then reactuate valves 19, 27 and 29 to again supply a vacuum to servo 11.

Should the vehicle be placed into neutral while the speed control is on, the neutral safety switch 69 will close, providing a ground path through solenoid 71 for pin 7, causing control module 33 to deenergize valves 19, 27, and 29. Also, should the engine reach a higher RPM than within its range for operating the cruise control, the tachometer reading from ignition coil 73 on pin 8 of the wire harness plug 31 will cause the control module 33 to deenergize valves 19, 27 and 29.

Figure 2:
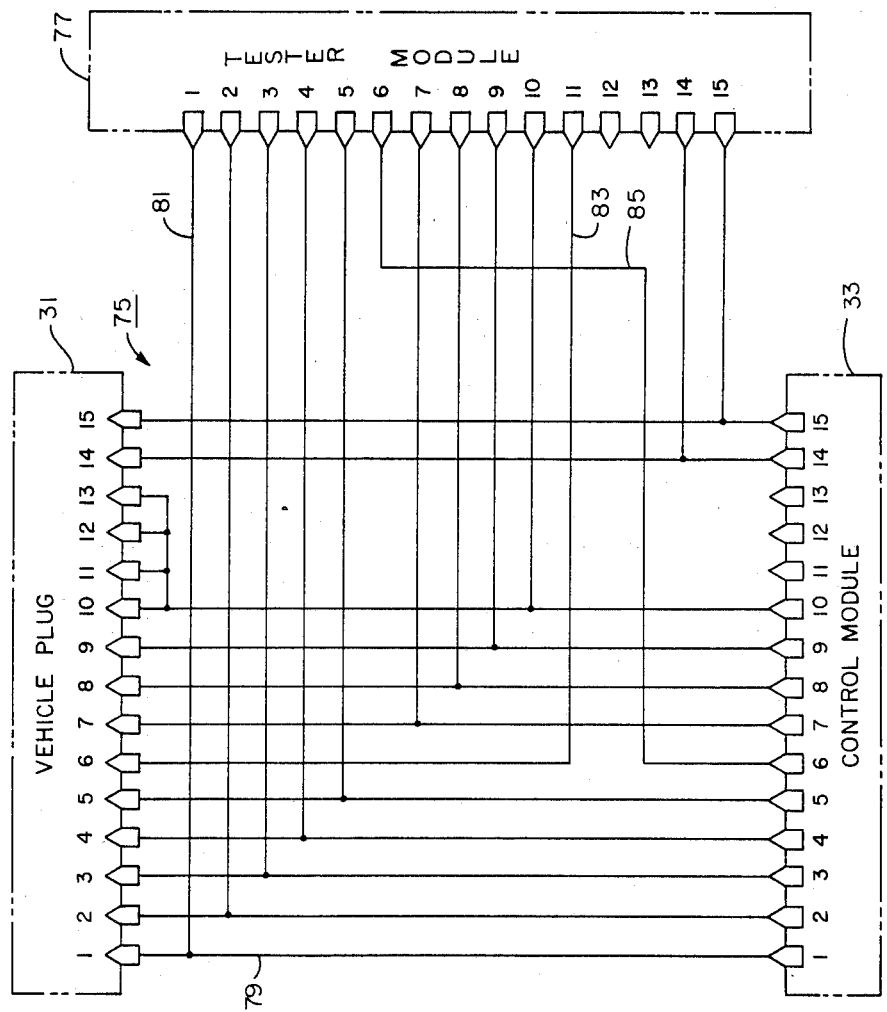
FIG. 2 is a schematic view illustrating the test plug.

The testing circuit includes a test plug 75 which has terminals on both sides so that it may be plugged directly between the wire harness plug 31 and the receptacle of the control module 33. A tester module 77 is connected to test plug 75 to test continuity of the various leads, test operability of the solenoids, and also test operability of the control module. Referring to FIG. 2, test plug 75 includes a terminal that will mate with each terminal of the wire harness plug 31. The terminals of the test plug 75 are numbered to indicate which terminal of the wire harness plug 31 with which they will be in contact. Each terminal of the test plug 75, except terminals 6 and 11, has a series lead 79 connected to a mating terminal for connection to the control module 33. All signals and power on the terminals of the test plug 31, except for signals and power on terminals 6 and 11, pass directly through to the control module 33. Each series lead 79 has an indicator lead 81 tapped onto it and leading to a tester module 77. A bypass lead 83 connects the pin 6 from the wire harness plug 31 to pin 11 of the tester module 77. An oscillator input lead 85 connects pin 6 of control module 33 to pin 6 of tester module 77. Pin 11 of the test plug 75 on the vehicle plug side is connected to pin 10. Pins 9, 12 and 13 are not used with the particular system shown in FIG. 1, but have uses with other types of cruise control systems.

Figure 4:
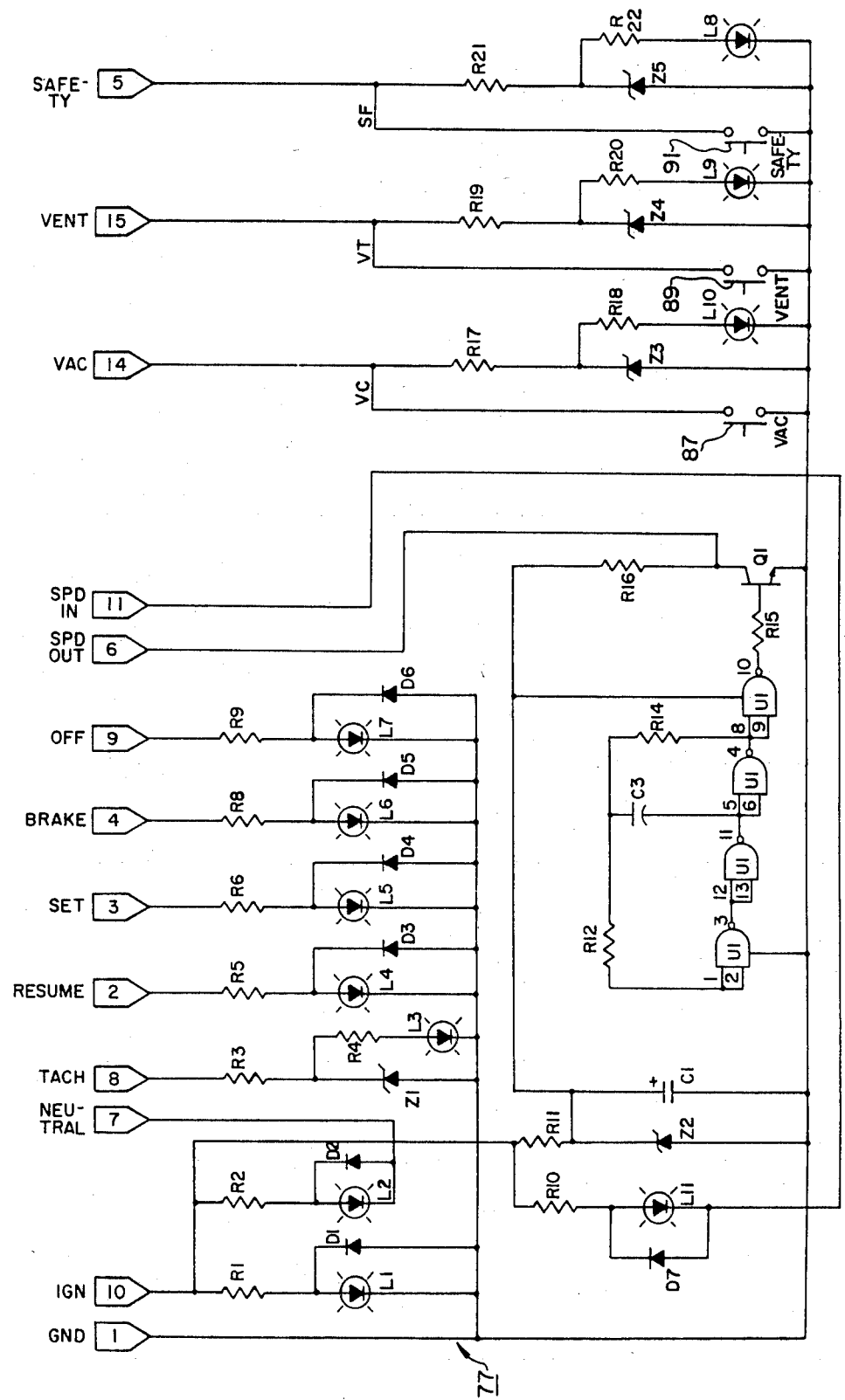
FIG. 4 is an electrical schematic of the tester module for the test means shown in FIG.'s 1–3.

Referring to FIG. 4, the tester module 77 includes circuitry for testing whether or not power or signals are present on the various terminals of the wire harness plug 31. This includes a number of indicating means, preferably light emitting diodes connected between ground and the various terminals of determining continuity. Pin 10, which determines if the power is present from the ignition switch 51 through the on contact, has a resistor R1 connected in series with a LED L1. LED L1 is connected to a ground line, grounded through pin 1. For reverse protection, a diode D1 is connected in parallel with LED L1. Pin 7 is connected between a LED L2, a resistor R2 and is connected to pin 10. A diode D2 is connected across LED L2. Pin 8 is connected to a resistor R3, which in turn is connected to ground through a Zener diode Z1. A resistor R4 and a LED L3 are connected across the Zener diode Z1. Pin 2 is connected to a resistor R5, which is connected to ground through a LED L5. A diode D3 is connected across LED L4. Pin 3 is connected through a resistor R6 and a LED 15 to ground. A diode D4 is connected across LED L5. Pin 4 is connected between a resistor R8 and LED L6 to ground. A diode D5 bypasses LED L6. Pin 9 is not used with the system of FIG. 1, but is similarly connected between a resistor R9 and a LED L7 to check continuity of other circuits that may be used in different types of cruise control systems. A diode D6 is connected across LED L7.

The ignition pin 10 also is connected to a resistor R10 and LED L11 to the pin 11. Diode D7 is connected across LED L11. A resistor R11 is connected to a Zener diode Z2 and ground. These components are part of an oscillator means, which also includes a capacitor C1 connected across Zener diode Z2. The oscillator is a conventional oscillator that is preset to provide pulses of a type that the speed sensor 37 (FIG. 1) would provide when traveling at a selected speed, for example 55 miles per hour. The oscillator includes a resistor R12 connected to pin 1 of a conventional integrated circuit U1 for providing the signals. The other side of resistor R12 is connected to a capacitor C3, which has its opposite side connected to pin 5 of the integrated circuit. A resistor R14 has one side connected to pin 8 of the integrated circuit and the other side connected to the junction between resistor R12 and capacitor C3. The output pin 10 of the oscillator drives a transistor Q1 through a resistor R15. The collector of transistor Q1 is connected to pin 6. A resistor R16 is connected between the collector of transistor Q1 and capacitor C1.

Means are provided for checking the continuity of the leads leading to the solenoid valves 19, 27, 29 (FIG. 1). This includes a resistor R17 connected to a Zener diode Z3, which in turn is connected to ground. A resistor R18 is connected across Zener diode Z3 and to a LED L10, which is connected to ground. A resistor R19 is connected to pin 15 and to a diode Z4, which is connected to ground. A resistor R20 and LED L9 are connected across Zener diode Z4. A resistor R21 is connected to pin 5 and to a Zener diode Z5, which is connected to ground. A resistor R22 and LED L8 are connected across Zener diode Z5.

Tester module 77 also has means for manually actuating the valves 19, 27 and 29 independent of the control module 33. This means includes a push button switch 87 connected between pin 14 and ground. A push button 89 is connected between pin 15 and ground. A push button 91 is connected between pin 5 and ground.

Figure 3:
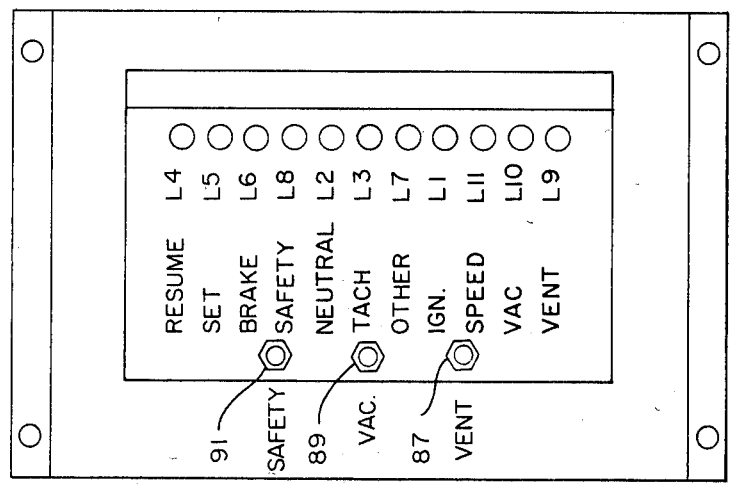
FIG. 3 is a front view of the tester module for the test means shown in FIG.'s. 1 and 2.

In operation of the test means, one first unplugs the vehicle wire harness plug 31 from the control module 33, then inserts the test plug 75 between, and connects the three elements together. Then the car should be started and the engine run for about 15 seconds to build up vacuum. While the engine is running, the technician will observe the face of the tester module 77, as shown in FIG. 3. The tach light L3 should be flashing because the ignition coil 73 is connected to pin 8 of the wire harness plug 31, as shown in FIG. 1. As shown in FIG. 4, pin 8, when energized will power LED L3. This indicates that continuity is present between the ignition coil 73 and the control module 33.

The engine should then be stopped and ignition switch 51 turned to the on position. The cruise control selector switch 39 should be placed in the on position and the car placed in neutral or park. At this time, the safety light L8, ignition light L1, vacuum light L10, and vent light L9 should come on. Referring to FIG. 1, the reason for this condition is that power will be provided from battery 55 through ignition switch 51, through switch 39 to line 41 and pin 10 of the wire harness plug 31. Referring now to FIG. 2, pin 10 is also connected to pin 11. Referring to FIG. 4, power on pin 10 lights diode L1. Referring back to FIG. 1, power on pin 11 is transmitted to the power side of each valve solenoid 19, 27 and 29. This power will be present on the pins 14, 15 and 5. Referring back to FIG. 4, power on the pins 14, 15 and 5 energizes the diodes L10, L9 and L8. This indicates that continuity is present between the control module 33 and the valves 19, 27 and 29.

The speed light L11 may be on or off if the speed sensor 37 is a reed switch type, depending upon the contact position of the switch. If the speed sensor is an inductive generator type, speed light L11 will glow.

Then, the brake pedal should be depressed. The brake light L6 should then come on and go off when released. The safety light will go out also. The reason for this, as shown in FIG. 1, is that depressing the brake switch 61 provides power on pin 4. As shown in FIG. 4, power on pin 4 energizes LED L6. When the brake pedal is depressed, the brake safety switch 35 (FIG. 1) will break the power provided to the safety valve 29. This interrupts power on pin 5 which, as shown in FIG. 4, removes power from LED L8.

If the vehicle is of a manual transmission type, depressing the clutch will cause the brake light L6 to glow dim. The safety light L8 will stay on. As shown in FIG. 1, the reason for this is that clutch safety switch 64 will open a circuit from pin 4 through brake lamp 63 to ground. This causes internal current in control module 33 on pin 4 to flow through resistor R8 and LED L6 to ground. This current is lower than the amount that exists when clutch switch 65 and brake switch 61 are closed, causing LED L6 to glow only dimly. The safety light L8 will stay on because the brake safety switch 35 (FIG. 1) is not affected by depression of the clutch safety switch 65.

Next, the set button 59 is depressed. The set light L5 should come on and the accelerator pedal 13 should move about halfway down. The safety light L8 should go out. The vent light L9 will be off or will flicker. The vacuum light L10 will be on most of the time. The reason for these indications is that depressing the set button provides power on pin 3. The voltage on pin 3 at the control module 33 signals the control module to ground pins 14 and 15 because it will be receiving a signal from the oscillator U1. This signal will simulate a signal from speed sensor 37 of 55 miles per hour, and the control module 33 will seek to sustain this speed by providing vacuum to the servo 11. Grounding of the pins 14 and 15 causes the valves 19 and 27 to energize, and causes the LED's L9 and L10 to go out. The vent line L9 may flicker because the control module 33 will be alternately grounding and removing the ground to maintain the vacuum in servo 11 that it believes necessary to provide the 55 mile per hour speed. The safety LED L8 will be out because of grounding of pin 5.

Then the brake should be depressed. This causes the brake light L6 to come on and the accelerator pedal to return to idle. The pedal will return to idle because brake switch 35 will open, deenergizing the safety valve 29. Also, brake switch 61 will close, providing a signal to the computer control module 33 that is to remove the ground from the pins 15, 14 and 5. Release of fhe vacuum in the servo 11 causes the pedal to return to idle.

Then, the selector switch 39 should be shifted to resume. The accelerator pedal should move about halfway down again. The reason for this is that shifting the selector switch 39 to resume applies power on pin 2, which signals the control module to again apply grounds for pins 15, 14 and 5. This reenergizes the valves 19, 27 and 29 to again apply vacuum to the servo 11.

To check whether or not the actual speed sensor 67 is operating, if it is a reed type switch, the vehicle should be rolled a couple of feet while the selector switch 39 is in the on position and the ignition 51 is in the on position. This will cause the speed light L11 to flash due to the interrupted grounding provided on pin 6 by the speed sensor 37. Pin 6 at the wire harness 31 is bypassed to pin 11 of the tester module 77. As shown in FIG. 4, interrupted grounding on pin 11 alternately completes the circuit across the diode L11. The diode L11 continually receives power from pin 10 while the selector switch 39 is in the on position.

The solenoid valves 19, 27 and 29 can be manually actuated to test them independently of the control module 33 in case the system does not work. The is accomplished by depressing the buttons 87, 89 and 91 (FIG. 4) while the ignition switch 51 is on and the selector switch 39 is in the on position. Depressing push buttons 87, 89 and 91 provides grounding for the pins 14, 15 and 5, completing the circuit through the coils of the solenoid valves 19, 27 and 29. Each should make an audible clicking noise when it's respective push button is depressed. Also, if all three are depressed simultaneously, the accelerator pedal 13 should pull to the floor as the vacuum valve 19 will be providing vacuum, and the valves 17 and 29 will be blocking atmospheric pressure. Releasing the vacuum button 87, while sustaining pressure on the buttons 89 and 91 will cause accelerator pedal 13 to remain on the floor. Releasing the vent button 89 should allow the accelerator pedal to pull up since atmospheric pressure whould then be communicated to the servo 11.

The inventiom has significant advantages. The system allows testing of the various components without test driving the vehicle. The test means will test both the control module, the continuity of the wires, and the various components. The solenoid valves can be checked independently of the control module.

While the invention has been shown in only one of its forms, it should be apparent to those skilled in the art that it is not so limited but is susceptible to various changes without departing from the scope of the invention.

I claim:

1. For use with a motor vehicle speed control system of the type having vacuum servo means for moving a throttle, solenoid valve means for increasing and decreasing the vacuum in the servo means, selector switch means for actuating the system and selecting the speed, an electronic control module for controlling the solenoid valve means in response to the speed selected, and speed sensor means for providing to the control module electrical pulses corresponding to the actual vehicle speed, an improved test means, comprising:
   a test circuit adapted to be connected to the control module and having series leads connecting terminals of the solenoid valve means and selector switch means directly with respective terminals of the control module;
   indicating means in the test circuit for indicating whether or not voltage potential is present in the series leads; and
   oscillator means in the test circuit for applying pulses to the control module that simulate pulses provided by the speed sensor means corresponding to a selected speed.

2. The test means according to claim 1 wherein the indicating means comprises:
   an indicating lead connected to each series lead and connected through a light source to ground, so that voltage potential present in each of the series leads will energize the light source.

3. The test means according to claim 1 wherein the test circuit further comprises means for shifting the solenoid valve means independently of the control module.

4. The test means according to claim 1 wherein the test circuit has a bypass lead connecting a terminal of the speed sensor means through a light source to a voltage source, so that grounding by the speed sensor means will actuate the light source.

5. For use with a motor vehicle speed control system of the type having vacuum servo means for moving a throttle, solenoid valve means for increasing and decreasing the vacuum in the servo means, selector valve means for actuating the system and selecting the speed, an electronic control module for controlling the solenoid valve means in response to the speed selected, and speed sensor means for providing to the control module electrical pulses corresponding to the actual vehicle speed, the solenoid valve means, speed sensor means and selector switch means having terminals connected into a wire harness which has a plug connected to terminals of the control module, an improved test means, comprising:
   a test circuit adapted to be connected between the wire harness plug and the control module;
   the test circuit having series leads interconnecting the terminals of the solenoid switch means and selector switch means directly with the respective terminals of the control module;
   the test circuit having oscillator means for providing output pulses that simulate pulses provided by the speed sensor means corresponding to a selected speed, the oscillator means output pulses being applied to the terminal of the control module that normally receives the speed sensor pulses.

6. For use with a motor vehicle speed control system of the type having vacuum servo means for moving a throttle, vacuum solenoid valve means for drawing a vacuum in the servo means and vent solenoid valve means for venting the servo means to atmosphere, selector switch means for actuating the system and selecting the speed, an electronic control module for controlling the solenoid valve means in response to the speed selected, and speed sensor means for providing to the control module electrical pulses corresponding to the actual vehicle speed, the solenoid valve means, speed sensor means and selector switch means having terminals connected into a wire harness which has a plug connected to terminals of the control module, an improved test means, comprising:
- a test circuit adapted to be connected between the wire harness plug and the control module;
- the test circuit having series leads interconnecting the terminals of the solenoid valve means and selector switch means directly with the respective terminals of the control module;
- oscillator means in the test circuit for providing output pulses that simulate pulses provided by the speed sensor means corresponding to a selected speed, the oscillator means output pulses being applied to the terminal of the control module that normally receives the speed sensor pulses;
- an indicating lead connected to each series lead and connected through a light source to ground, so that voltage potential present in each of the series leads will energize the light source;
- a vacuum switch means connected between ground and the indicating lead that is connected to the series lead of the vacuum solenoid means for selectively providing a path to ground for energizing the vacuum solenoid means; and
- a vent switch means connected between ground and the indicating lead that is connected to the series lead of the vent solenoid means, for selectively providing a path to ground for energizing the vent solenoid means.

7. A method of testing a motor vehicle speed control system of the type having vacuum servo means for moving a throttle, solenoid valve means for increasing and decreasing the vacuum in the servo means, selector switch means for actuating the system and selecting the speed, an electronic control module for controlling the solenoid valve means in response to the speed selected, and speed sensor means for providing to the control module electrical pulses corresponding to the actual vehicle speed, the method of testing comprising in combination:
- disconnecting an output terminal of the speed sensor means from a speed sensor input terminal on the control module;
- connecting to the control module speed sensor input terminal from a speed sensor input terminal on the control module;
- connecting to the control module speed sensor input terminal an oscillator means for providing pulses that simulate pulses provided by the speed sensor means corresponding to a selected speed;
- electrically connecting terminals of the solenoid valve means and selector switch means to respective terminals of the control module; and
- turning the selector switch means on and energizing the oscillator means to provide pulses to the control module, to cause it to energize the solenoid valve means to simulate actual operation of the speed control system.

* * * * *